Dec. 20, 1938.  K. OSTBERG  2,140,760
MEANS FOR ADJUSTING CUTTING HEIGHTS OF LAWN MOWERS
Filed May 21, 1937
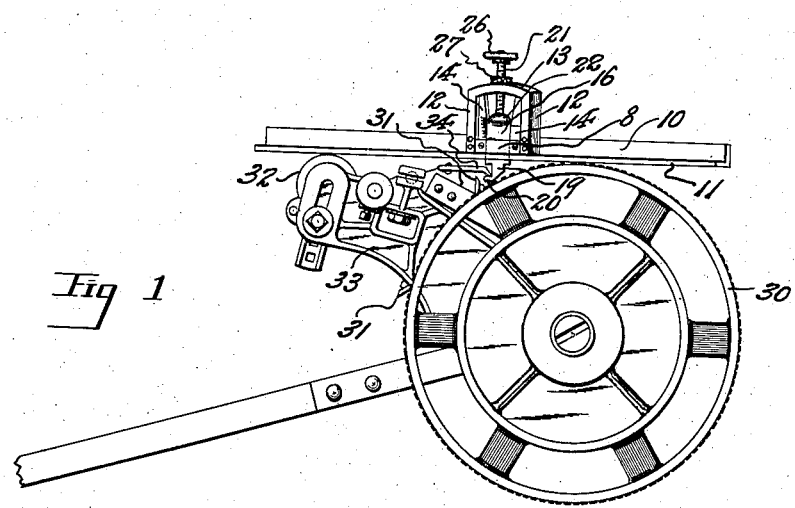
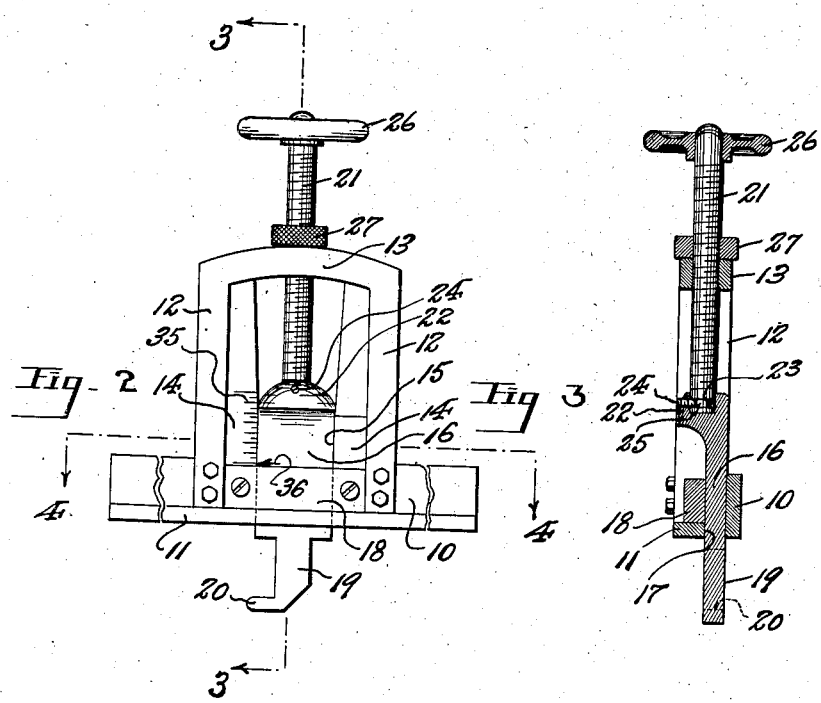
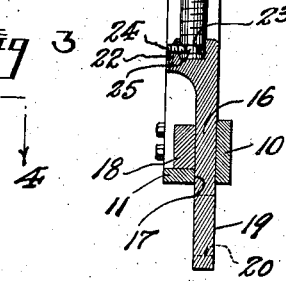
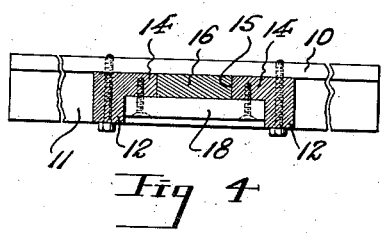
INVENTOR.
Karl Ostberg,
BY
George D. Richards
ATTORNEY.

Patented Dec. 20, 1938

2,140,760

UNITED STATES PATENT OFFICE 2,140,760

MEANS FOR ADJUSTING CUTTING HEIGHTS OF LAWN MOWERS

Karl Ostberg, Springfield, N. J.

Application May 21, 1937, Serial No. 143,929

4 Claims. (Cl. 33—185)

This invention relates, generally, to an improved gauge for use in adjusting lawn mowers and like machines to predetermine the standing height of grass resulting from the cutting of lawns, golf fairways and greens by the adjusted lawn mower or the like.

The standing height of grass when cut or trimmed by the operation of a lawn mower is dependent upon the distance at which the bed knife of such machine is supported above the ground or soil level by the drive wheels or drum and the traction roller or equivalent means of the machine. Such distance is subject to variation by vertically shifting the fixed position of the traction roller or equivalent means relative to the machine frame. It is a matter of considerable difficulty to accurately effect such adjustments of the traction roller or equivalent means, especially within narrow limits, such as a few fractions of an inch, and not only requires considerable effort and patience, but is only ultimately attained by trial and error methods involving considerable checking by hand measurements, and even then there is little assurance that the setting of the bed knife is uniformly accurate and at the desired point for a given desired cutting height.

It is the principal object of this invention to provide a novel, simple and easily manipulated and applied gauge tool by means of which the desired cutting height adjustment of the bed knife of a lawn mower or the like may be quickly and accurately attained with a minimum of effort.

Another object of this invention is to provide a gauge tool having a novel form of bed knife engaging gauge finger or stop together with means for quickly and easily setting the same for a selected predetermined measurement.

Other objects of the invention, not at this time more particularly enumerated, will be understood from the following detailed description of the same.

An illustrative embodiment of the gauge tool according to this invention is shown in the accompanying drawing, in which:—

Fig. 1 shows the operative application of the gauge tool to a lawn mower when utilizing the same to adjust the cutting height of the bed knife of the latter.

Fig. 2 is an enlarged front elevation of the gauge tool per se, with parts broken away to reduce the length thereof; Fig. 3 is a vertical cross-section, taken on line 3—3 in Fig. 2; and Fig. 4 is a horizontal section, taken on line 4—4 in Fig. 2.

Similar characters of reference are employed in the above described views, to indicate corresponding parts.

In a preferred form thereof, the novel gauge tool according to this invention, comprises a straight edge bar 10 of sufficient length to bridge across and between a drive wheel or drum and the traction roller or equivalent means of a lawn mower or the like when applied tangentially to and across such parts. Preferably said straight edge bar 10 is provided in the form of an angle bar, the horizontal flange 11 of which is used as the straight edge surface for contacting the lawn mower traction wheel and roller. The wide area of such horizontal flange 11 provides an efficient contacting footing for this purpose which stabilizes the gauge tool as operatively applied to the lawn mower without tendency of the tool to tip or tilt laterally, and consequently assures the proper disposition of the gauge finger or stop means in a right angular relation to the edge plane of the lawn mover bed knife, and thus likewise prevents any tilting of the gauge finger or stop means which if permitted might import error in a given adjustment of the bed knife which it is desired to obtain.

Secured to the vertical flange of the straight edge bar 10, within the angle of the latter and at a point intermediate the bar ends, is an upstanding yoke frame comprising spaced leg portions 12 and a head piece 13 bridging across and between the upper ends of said leg portions. Provided in connection with the inner sides of said leg portions 12, and contiguous to the inner face of the vertical flange of the straight edge bar 10, are slideway or guide members 14, which form an intermediate vertical slideway 15 between the opposed edges thereof.

Vertically slidable in the slideway 15 is a gauge plate 16. The horizontal flange 11 of the straight edge bar is provided with a through opening 17 aligned with the slideway 15, so that the gauge plate 16 may be projected downwardly therethrough. Secured to and across the outer faces of said guide members 14 is a keeper plate 18 which forms the front wall of the slideway 15, the back wall of the latter being formed by the vertical flange of said straight edge bar 10. At its lower free end, said gauge plate 16 is provided with an extension 19 of reduced width, from the extremity of which extends a laterally projecting gauge finger or stop 20.

The means for movably adjusting said gauge plate and its gauge finger or stop comprises an adjusting screw 21 which is threaded through the head piece 13 of the yoke frame. The upper end of said gauge plate 16 is provided with a socketed portion 22 in the socket 23 of which the lower end of said adjusting screw is rotatably engaged, being coupled to the socketed portion 22 by a coupling screw 24 which enters an annular groove or channel 25 with which said lower end of the adjusting screw is provided. The upper extremity of said adjusting screw 21 is provided with a hand wheel 26 for manipulating the same. In order to supply means for immovably securing the gauge plate in any given position to which it has been adjusted, a jamb lock-nut 27 is provided thereon to engage the yoke frame head piece 13.

To illustrate the manner of using the gauge tool, I have shown in Fig. 1 the operative application thereof to an ordinary lawn mower machine having drive wheels 30 to impart motion to the rotatable reel blades 31, and a traction roller 32 adjustably mounted in any suitable manner and by suitable means in connection with the machine frame 33; the machine being also provided with a stationary bed knife 34 suitably affixed to and supported by the frame 33, intermediate the drive wheels 30 and traction roller 32, for cooperation with the reel blades 31.

In the use of the gauge tool, the gauge plate 16 is adjusted by manipulating the adjusting screw 21 to project the gauge finger or stop 20 until its inner side is spaced from the bearing face of the straight edge bar a distance equivalent to the standing height to which it is desired that grass shall be trimmed by the lawn mower operation. This distance may be predetermined by adjusting the gauge plate 16 relative to a suitably graduated measurement scale 35 which is provided at the side of the slideway 15, as e. g. by etching or otherwise providing the scale marks on the face of an adjacent guide member 14; the gauge plate 16 having applied thereon a reference or indicating mark 36 for cooperation with said scale. After the gauge finger or stop 20 is adjusted in desired spaced relation to the bearing surface of the straight edge bar, the gauge plate 16 is locked against accidental displacement from adjusted position by tightening up the jamb or lock nut 27, whereupon the gauge tool is ready for application to the lawn mower, to assist in effecting the desired adjustment thereof.

Preparatory to operatively applying the gauge tool to the lawn mower, the latter is inverted, as shown in Fig. 1, and thereupon the straight edge bar is laid in bridging relation upon and across the drive wheel 30 and the traction roller 32 in tangent relation to the circumferences thereof, whereupon the bar is moved longitudinally so as to project the gauge finger or stop 20 over the cutting edge of the bed knife 34. The traction roller 32 supports are loosened so that this roller may be readily moved relative to the frame 33. The traction roller is now moved to a position to so shift the straight edge bar as to bring the inner edge of the gauge finger or stop 20 into abutting relation to the bed knife edge, whereupon the traction roller is again tightened or fixed in the position to which it has been so moved. This effects the adjustment of the cutting length of the bed knife quickly and accurately, and the cutting edge thereof will be disposed, when the gauge tool is removed and the lawn mower is righted and placed on the ground, at the exact distance from the ground or soil level which corresponds to the standing height to which the grass will be trimmed when the lawn mower is operatively moved over the lawn, green or other place upon which its operation is desired. It will be obvious, that not only accurate adjustments may be made, but that variations of adjustments within very narrow limits can be quickly attained with ease.

It will be understood that various changes may be made in the above described gauge tool structure, and many apparently widely different embodiments of this invention may be made without departing from the scope thereof as defined by the following claims. It is therefore intended that all matter contained in the above description or shown in the accompanying drawing shall be interpreted as illustrative and not in a limiting sense.

I claim:—

1. Means for predetermining the height setting of a lawn mower bed knife relative to the traction plane of the mower drive wheels and traction roller comprising, an angle bar the horizontal flange of which provides a bridging base for application to the peripheries of and for extension between a mower drive wheel and traction roller, a yoke frame affixed to the vertical flange of said angle bar intermediate its ends and perpendicular to its horizontal flange, means on the inner sides of said yoke frame to provide a slideway, a gauge plate movable in said slideway, said horizontal flange of said angle bar having a passage through which said gauge plate extends, a gauge plate adjusting screw threaded through the head of said yoke frame, a swivel connection between said screw and said gauge plate, said gauge plate having a laterally projecting bed-knife engaging gauge finger at its free end, and said slideway means and gauge plate having cooperative setting scale means.

2. A device of the kind described as defined in claim 1, including a jam nut on said screw cooperative with the head of said yoke frame to lock said gauge plate in predetermined adjusted position.

3. Means for predetermining the height setting of a lawn mower bed-knife relative to the traction plane of the mower drive wheels and traction roller comprising, a bridging means of a length exceeding the distance between a mower drive wheel and traction roller and adapted to be applied to the peripheries of the latter in supported bridging extension therebetween, a slideway frame affixed to said bridging means intermediate its ends and perpendicular thereto, a gauge plate movable in said slideway and projectable beyond the bottom face of said bridging means, a gauge plate adjusting screw threaded through the head of said slideway frame, a swivel connection between said screw and said gauge plate, said gauge plate having a laterally projecting bed-knife engaging gauge finger at its projected free end, and said slideway frame and gauge plate having cooperative setting scale means.

4. A device of the kind described as defined in claim 3, including a jam nut on said screw cooperative with the head of said slideway frame to lock said gauge plate in predetermined adjusted position.

KARL OSTBERG.